United States Patent
Tanemura et al.

(10) Patent No.: US 10,078,406 B2
(45) Date of Patent: Sep. 18, 2018

(54) CAPACITIVE SIDE POSITION EXTRAPOLATION

(71) Applicant: Synaptics Incorporated, San Jose, CA (US)

(72) Inventors: Tetsuo Tanemura, Tokyo (JP); Petr Shepelev, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 143 days.

(21) Appl. No.: 15/087,583

(22) Filed: Mar. 31, 2016

(65) Prior Publication Data

US 2017/0285794 A1    Oct. 5, 2017

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01); *G06F 2203/04108* (2013.01)

(58) Field of Classification Search
CPC .................. G06F 3/044; G06F 3/0416; G06F 2203/04103
USPC .................................................. 345/173, 174
See application file for complete search history.

(56) References Cited

U.S. PATENT DOCUMENTS

| | | | |
|---|---|---|---|
| 8,279,194 B2 | 10/2012 | Kent et al. | |
| 8,593,431 B1 | 11/2013 | Karpin et al. | |
| 8,633,915 B2 | 1/2014 | Hotelling et al. | |
| 8,686,965 B2 | 4/2014 | Mi | |
| 9,047,009 B2 | 6/2015 | King et al. | |
| 9,116,589 B2 | 8/2015 | Mi | |
| 2006/0197750 A1* | 9/2006 | Kerr | G06F 1/1626 345/173 |
| 2011/0025629 A1* | 2/2011 | Grivna | G06F 3/0416 345/173 |
| 2011/0175847 A1* | 7/2011 | Wang | G06F 3/044 345/174 |
| 2011/0210936 A1 | 9/2011 | Wang et al. | |
| 2012/0075233 A1 | 3/2012 | Lakshminarayanan et al. | |
| 2012/0212445 A1 | 8/2012 | Heikkinen et al. | |
| 2013/0154996 A1 | 6/2013 | Trend et al. | |
| 2014/0132551 A1 | 5/2014 | Bathiche | |
| 2014/0184552 A1 | 7/2014 | Tanemura | |
| 2014/0218333 A1 | 8/2014 | Wang | |
| 2014/0247401 A1 | 9/2014 | Lee et al. | |
| 2014/0267127 A1 | 9/2014 | Solven et al. | |
| 2014/0362001 A1 | 12/2014 | Westerman et al. | |
| 2014/0368750 A1 | 12/2014 | Liao et al. | |
| 2015/0022734 A1 | 1/2015 | Yang | |

(Continued)

*Primary Examiner* — Chun-Nan Lin
(74) *Attorney, Agent, or Firm* — Ferguson Braswell Fraser Kubasta PC

(57) ABSTRACT

A method for capacitive sensing includes acquiring a mutual capacitive measurement including effects of sensing signals of a sensing region, and acquiring an absolute capacitive measurement including effects of the sensing signals. The method further includes performing a comparison of the mutual capacitive measurement and the absolute capacitive measurement, and detecting a presence of an input object proximate to a side surface of an input device based on the comparison. The side surface is at least substantially orthogonal to the sensing region on the input device. The method further includes reporting the presence of the input object.

20 Claims, 10 Drawing Sheets

(56) References Cited

U.S. PATENT DOCUMENTS

| | | |
|---|---|---|
| 2015/0049258 A1 | 2/2015 | Qiu et al. |
| 2015/0309531 A1 | 10/2015 | Tanemura et al. |
| 2015/0309610 A1* | 10/2015 | Rabii .................. G06F 3/044 345/174 |
| 2015/0346889 A1* | 12/2015 | Chen .................. G06F 3/0416 345/174 |

* cited by examiner

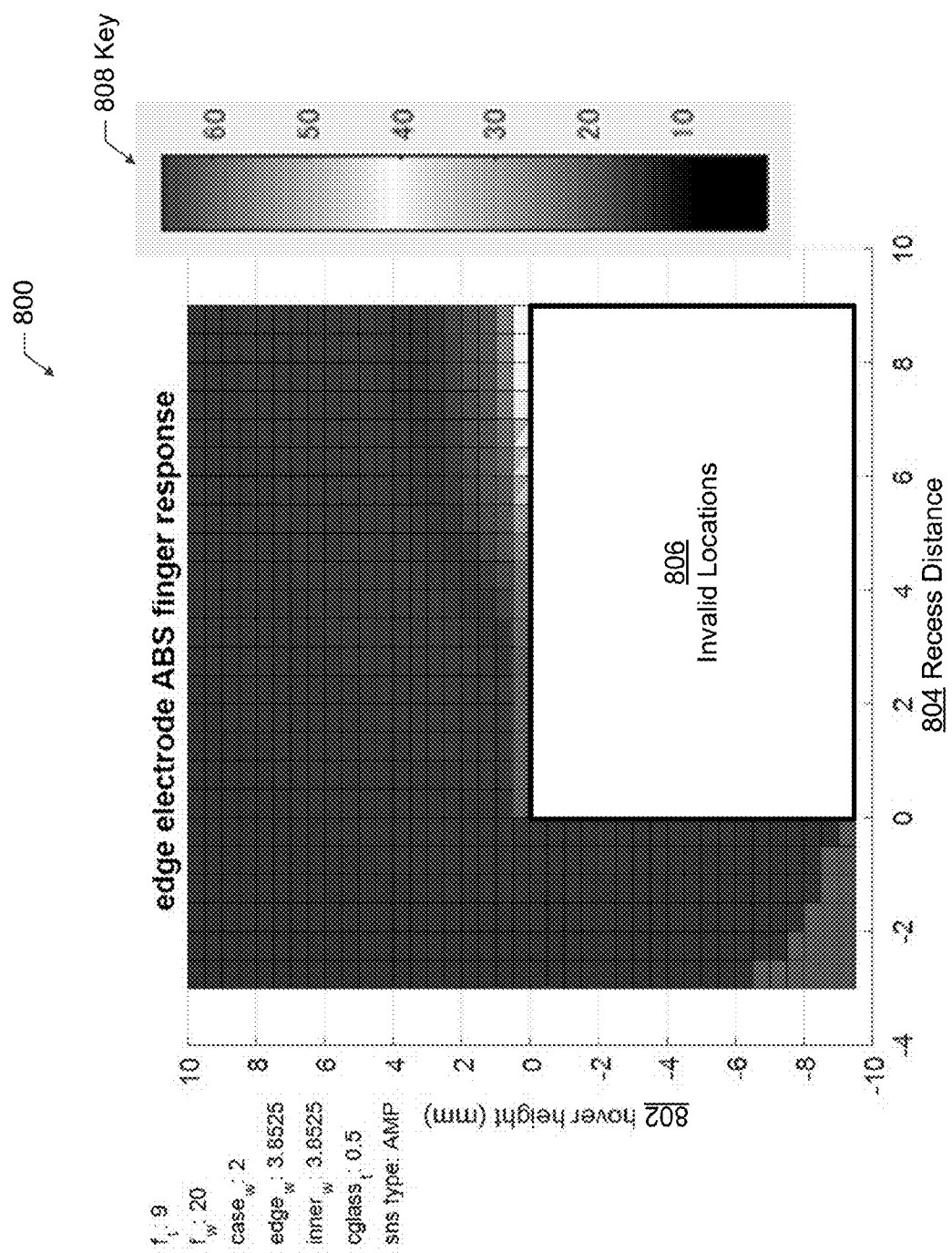
FIG. 8.1

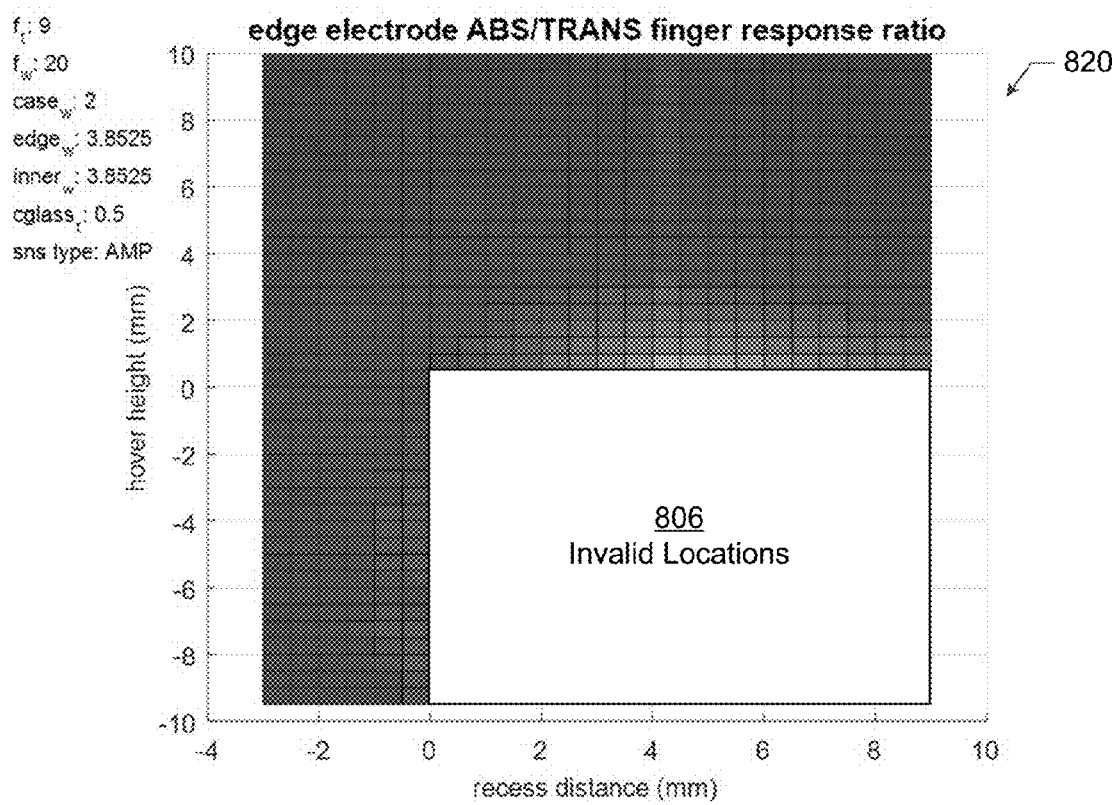
*FIG. 8.2*
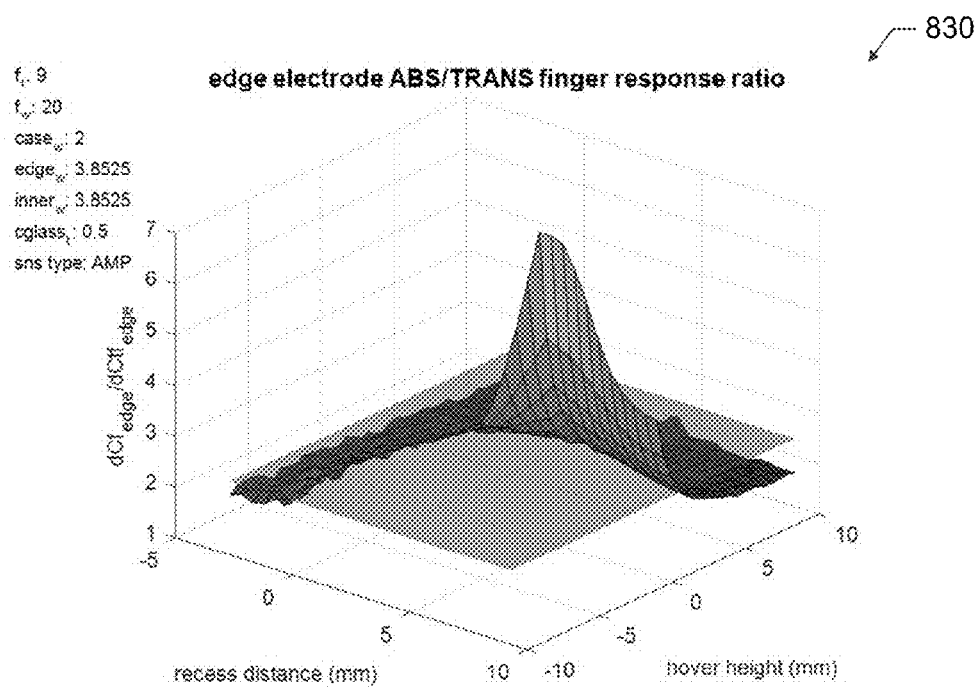
*FIG. 8.3*

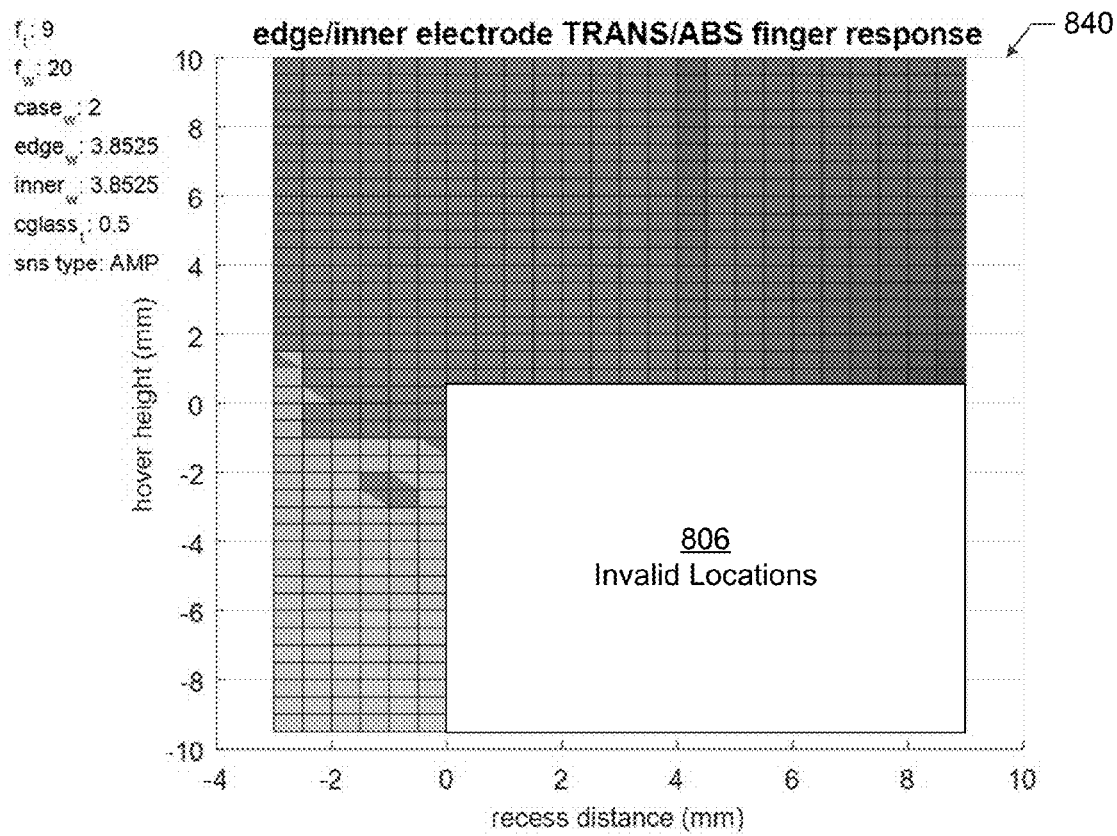
*FIG. 8.4*
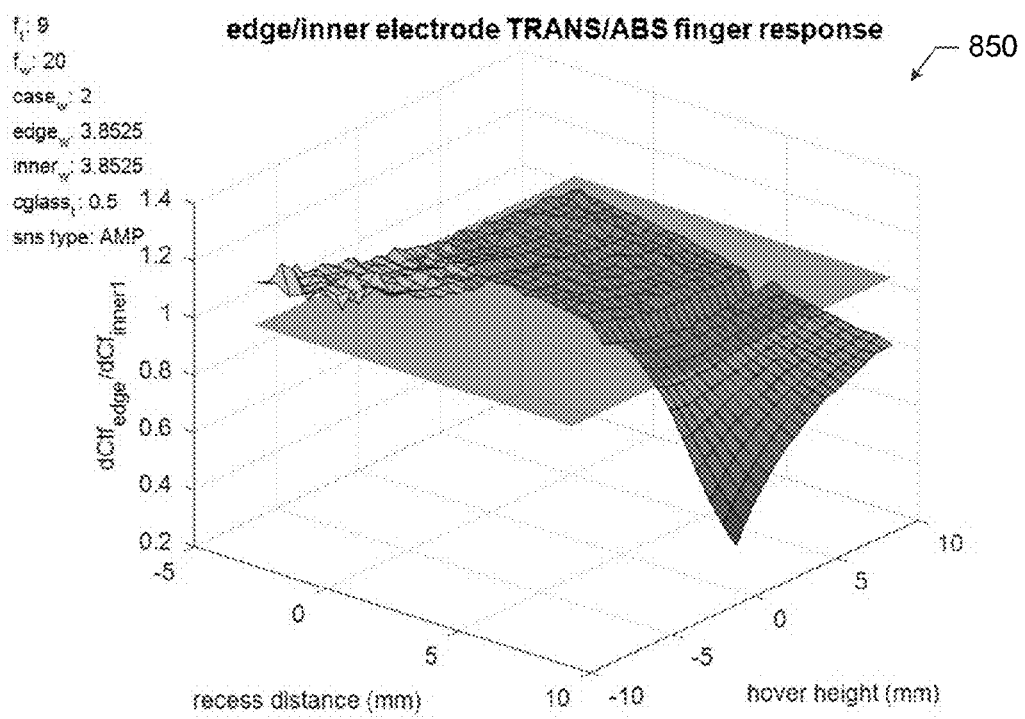
*FIG. 8.5*

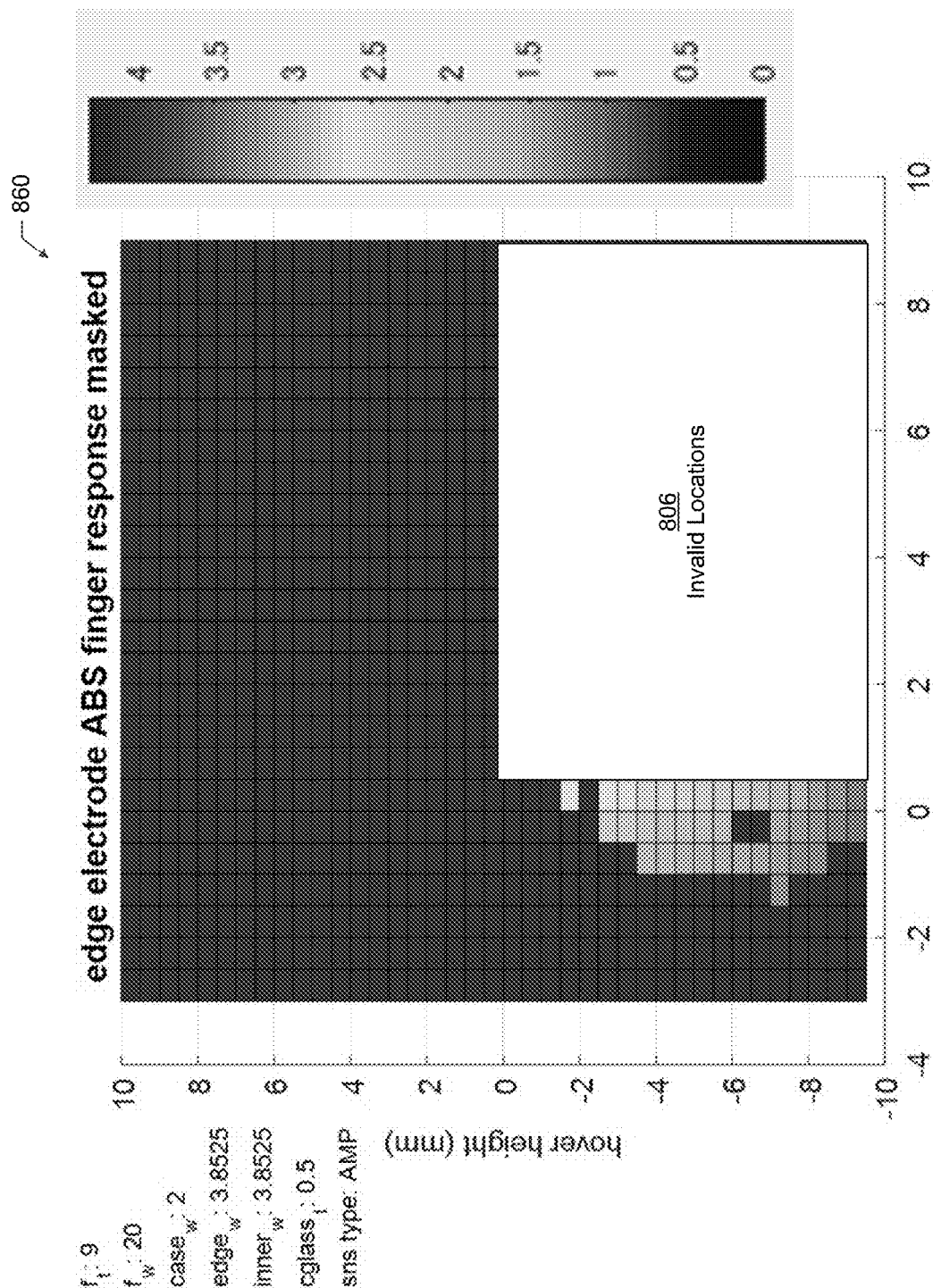
FIG. 8.6

CAPACITIVE SIDE POSITION EXTRAPOLATION

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system configured for capacitive side touch response extrapolation. The processing system includes sensor circuitry with functionality to drive sensing signals on multiple sensor electrodes of a sensing region, acquire a mutual capacitive measurement including effects of the sensing signals, and acquire an absolute capacitive measurement including effects of the sensing signals. The sensing region includes a surface sensing region. The processing system further includes processing circuitry with functionality to perform a comparison of the mutual capacitive measurement and the absolute capacitive measurement, and detect a presence of an input object proximate to a side surface of an input device based on the comparison. The side surface is at least substantially orthogonal to the surface sensing region on the input device. The processing circuitry further includes functionality to report the presence of the input object.

In general, in one aspect, one or more embodiments relate to a method for capacitive sensing including acquiring a mutual capacitive measurement including effects of sensing signals of a sensing region, acquiring an absolute capacitive measurement including effects of the sensing signals, performing a comparison of the mutual capacitive measurement and the absolute capacitive measurement, and detecting a presence of an input object proximate to a side surface of an input device based on the comparison. The sensing region includes a surface sensing region. The side surface is at least substantially orthogonal to the surface sensing region on the input device. The method further includes reporting the presence of the input object.

In general, in one aspect, one or more embodiments relate to an input device for capacitive sensing including multiple sensor electrodes for receiving resulting signals from capacitive sensing signals, and a processing system. The processing system is configured to drive sensing signals on multiple sensor electrodes of a sensing region, acquire a mutual capacitive measurement using the resulting signals, acquire an absolute capacitive measurement using the resulting signals, and perform a comparison of the mutual capacitive measurement and the absolute capacitive measurement. The sensing region includes a surface sensing region. The processing system is further configured to detect a presence of an input object proximate to a side surface of an input device based on the comparison. The side surface is at least substantially orthogonal to the surface sensing region on the input device. The processing system is further configured to report the presence of the input object.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and:

FIGS. 7, 8.1, 8.2, 8.3, 8.4, 8.5, and 8.6 show examples in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed determining a presence of an input object proximate to the side surface of an input device. In order to determine the presence, one or more embodiments acquire an absolute capacitive measurement and a mutual capacitive measurement of the sensing region and perform a comparison thereof. Based on the comparison, the presence of the input object in the side surface may be detected.

Figure 1:
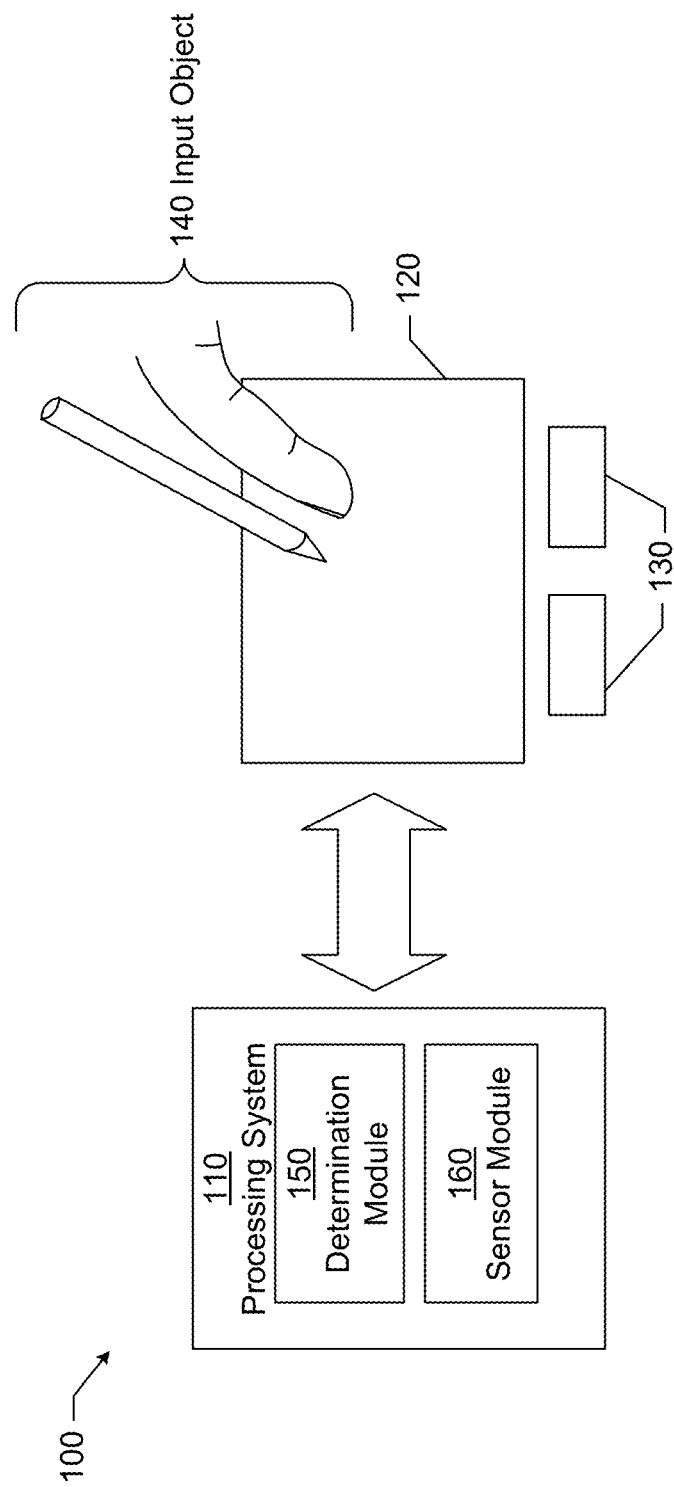
FIGS. 1, 2, and 3 show schematic diagrams in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the processing system may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In other embodiments, one or more of sensor electrodes are disposed on the same side or surface of the common substrate and are isolated from each other in the sensing region. The sensor electrodes may be disposed in a matrix array where each sensor electrode may be referred to as a matrix sensor electrode. The matrix array may correspond to a grid pattern. Each sensor electrode of sensor electrodes may be substantially similar in size and/or shape. In one embodiment, one or more of the sensor electrodes of the matrix array of sensor electrodes may vary in at least one of the size and shape. Each sensor electrode of the matrix array may correspond to a pixel of a capacitive image (i.e., capacitive pixel). Further, two or more sensor electrodes of the matrix array may correspond to a pixel of a capacitive image (i.e., capacitive pixel). In other words, a capacitive pixel is a location at which a measurement is acquired. In various embodiments, each sensor electrode of the matrix array may be coupled to a separate capacitive routing trace of a plurality of capacitive routing traces. In various embodiments, the sensor electrodes include one or more gird electrodes disposed between at least two sensor electrodes of the sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region (e.g., in a connection region). In one or more embodiments, a floating electrode may be disposed between the grid electrode and the sensor electrodes. In one particular embodiment, the floating electrode, the grid electrode and the sensor electrode include the entirety of a common electrode of a display device.

In any sensor electrode arrangement (e.g., the matrix array described above), the sensor electrodes may be operated by the input device for mutual capacitive sensing by dividing the sensor electrodes into transmitter and receiver electrodes. As another example, in any sensor electrode arrangement (e.g., the matrix array described above), the sensor electrodes may be operated by the input device for absolute capacitive sensing. As another example, in any sensor electrode arrangement, a mixture of absolute and mutual capacitance sensing may be used. Further, one or more of the sensor electrodes or the display electrodes (e.g., source, gate, or reference (Vcom) electrodes) may be used to perform shielding.

A set of measurements from the capacitive pixels form a capacitive frame. In other words, the capacitive frame represents the set of measurements acquired for a moment in time. The measurements include effects of the capacitance, an input object in the sensing region, and any background capacitance. The capacitive frame may include a capacitive image that is representative of the capacitive couplings at the pixels and/or include a capacitive profile that is representative of the capacitive couplings or along each sensor electrode. Multiple capacitive frames may be acquired over multiple time periods, and differences between them may be used to derive information about input in the sensing region. For example, successive capacitive frames acquired over successive periods of time can be used to track the motion(s) of one or more input objects entering, exiting, and within the sensing region.

The background capacitance of a sensor device is the capacitive frame associated with no input object in the sensing region. The background capacitance changes with the environment and operating conditions, and may be estimated in various ways. For example, some embodiments take "baseline frames" when no input object is determined to be in the sensing region, and use those baseline frames as estimates of their background capacitances.

Capacitive frames can be adjusted for the background capacitance of the sensor device for more efficient processing. Some embodiments accomplish this by "baselining" measurements of the capacitive couplings at the capacitive pixels to produce "baselined capacitive frames." That is, some embodiments compare the measurements forming capacitance frames with appropriate "baseline values" of "baseline frames", and determine changes from that baseline image.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include processing circuitry (150) and sensor circuitry (160). The processing circuitry (150) may correspond to hardware circuitry, such as a central processing unit, an application specific integrated circuit, or other hardware. The processing circuitry (150) may include functionality to detect a presence of moisture, operate based on the presence of moisture, determine when at least one input object is in a sensing region, determine signal to noise ratio, determine positional information of an input object, identify a gesture, determine an action to perform based on the gesture, a combination of gestures or other information, perform other operations, and/or perform any combination of operations.

The sensor circuitry (160) may correspond to hardware circuitry, such as a central processing unit, an application specific integrated circuit, or other hardware that includes functionality to drive the sensor electrodes. For example, the sensor module (160) may include sensory circuitry that is coupled to the sensing elements.

Although FIG. 1 shows the processing circuitry (150) and the sensor circuitry (160) as separate components, all or part of the processing circuitry (150) may be the same as the sensor circuitry (160). Further, although FIG. 1 shows only processing circuitry (150) and sensor circuitry (160), alternative or additional hardware circuitry may exist in accordance with one or more embodiments of the invention. Such alternative or additional circuitry may correspond to distinct circuitry or sub-circuitry than one or more of the circuitry discussed above. Example alternative or additional circuitry includes hardware operation circuitry for operating hardware such as sensor electrodes and display screens, data processing circuitry for processing data such as sensor signals and positional information, reporting circuitry for reporting information, and identification circuitry configured to identify gestures, such as mode changing gestures, and mode changing circuitry for changing operation modes. Further, the various circuitries may be combined in separate integrated circuits. For example, a first circuitry may be comprised at least partially within a first integrated circuit, and a separate circuitry may be comprised at least partially within a second integrated circuit. Further, portions of a single circuitry may span multiple integrated circuits. In some embodiments, the processing system as a whole may perform the operations of the various circuitries.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

In various embodiments, the input device (100) may include one or more sensor electrodes configured for both display updating and input sensing. For example, at least one sensor electrode that is used for input sensing may comprise one or more display electrodes of the display device that are used in updating the display. Further, the display electrode may include one or more of segments of a Vcom electrode (common electrodes), source drive lines (electrodes), gate line (electrodes), an anode sub-pixel electrode or cathode pixel electrode, or any other display element. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the display electrode can also be referred to as a "combination electrode", since it performs multiple functions. In various embodiments, each of the sensor electrodes includes one or more display electrodes associated with a pixel or sub pixel. In other embodiments, at least two sensor electrodes may share at least one display electrode associated with a pixel or sub-pixel.

In various embodiments, a first sensor electrode includes one or more display electrodes configured for display updating and capacitive sensing and a second sensor electrode may be configured for capacitive sensing and not for display updating. The second sensor electrode may be disposed between substrates of the display device or external from the display device. In some embodiments, all of the sensor electrodes may include one or more display electrodes configured for display updating and capacitive sensing.

Processing system (110) may be configured to perform input sensing and display updating during at least partially overlapping periods. For example, a processing system (110) may simultaneously drive a first display electrode for both display updating and input sensing. In another example, processing system (110) may simultaneously drive a first display electrode for display updating and a second display electrode for input sensing. In some embodiments, processing system (110) is configured to perform input sensing and display updating during non-overlapping periods. The non-overlapping periods may be referred to as non-display update periods. The non-display update periods may occur between display line update periods of common display frame and be at least as long as a display line update period. Further, the non-display update periods may occur between display line update periods of a common display frame and be one of longer than or shorter than a display line update period. In some embodiments, the non-display update periods may occur at the beginning of a display frame and/or between display frames. Processing system (110) may be configured to drive one or more of the sensor electrodes and/or the display electrodes with a shield signal. The shield signal may comprise one of a constant voltage signal or a varying voltage signal (guard signal). Further, one or more of the sensor electrodes and/or display electrodes may be electrically floated.

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
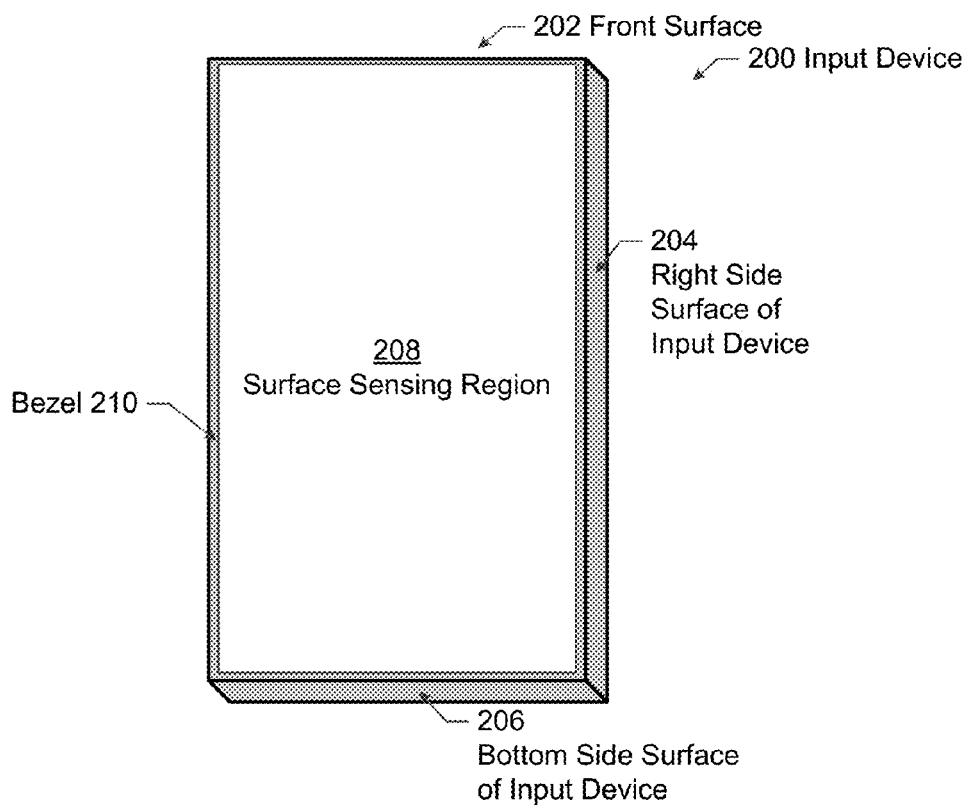

FIG. 2 shows an example diagram FIG. 2 shows a diagram of an example input device (200) in accordance with one or more embodiments of the invention. The diagram of FIG. 2 is for explanatory purposes only. The dimensions, shape, and curvature of the input device (200)

may vary without departing from the scope of the invention. As shown in FIG. 2, the input device (200) has a front surface (202), side surfaces (e.g., right side surface of input device (204), bottom side surface of input device (206)), and a back surface of the input device (not shown).

The front surface (202) may include a surface sensing region (208) that is surrounded by a bezel (210). The sensor electrodes may correspond to the sensor electrodes discussed above with reference to FIG. 1. The surface sensing region (208) is a portion of the sensing region that may be touched by a person. For example, the surface sensing region may correspond to a transparent covering (e.g., glass or other material) above a display. Sensor electrodes may be below the transparent covering and within the input device (200). In one or more embodiments of the invention, the sensor electrodes are arranged to be parallel to the surface sensing region. In other words, while one or more of the sensor electrodes may have lead lines or other aspects that are orthogonal to the surface sensing region or may be in different layers, the sensor electrodes together are arranged to be parallel to the surface sensing region. Therefore, in one or more embodiments of the invention, for equal size input objects, resulting signals from performing capacitive sensing are strongest on the surface sensing region (208) in comparison to the remainder of the sensing region. In other words, for an equal sized input object and equal type of measurements (e.g., mutual capacitive, absolute capacitive), the measurements obtained by an electrode may have greater magnitude on the surface sensing region than the remainder of the sensing region. In one or more embodiments of the invention, a bezel (210) may surround the surface sensing region (208) and may frame the transparent covering.

As shown in FIG. 2, the front surface (202) is connected to side surfaces (e.g., right side surface of input device (204), bottom side surface of input device (206)) of the input device (200). In particular, the side surfaces connect the front surface to the back surface, which is substantially parallel to the front surface. The side surface may be substantially orthogonal to the front surface and to the back surface. In some embodiments, substantially orthogonal is completely orthogonal (e.g., as shown in FIG. 2). In other embodiments, substantially orthogonal may be curved and a virtual line connecting the start of the side at the front surface and the end of the side at the back surface is orthogonal to the front surface. Further, the side may include multiple components. The side may be formed as a single piece of material with the front surface, a single piece of material with the back surface, and/or both regions.

The bezel and the remaining surfaces of the input device may not have a surface sensing region. One or more embodiments are directed to detecting a presence of input object proximate to a side surface of the input device. In one or more embodiments, being proximate to the side surface is touching the side surface. In one or more embodiments, being proximate to the side surface is being within a pre-defined threshold distance to the side surface. In one or more embodiments, being proximate to the side surface means that the input object is closer to a side surface than to the surface sensing region. Other definitions of proximate may be used without departing from the scope of the invention. Further, the various definitions may be combined into a single definition.

Figure 3:
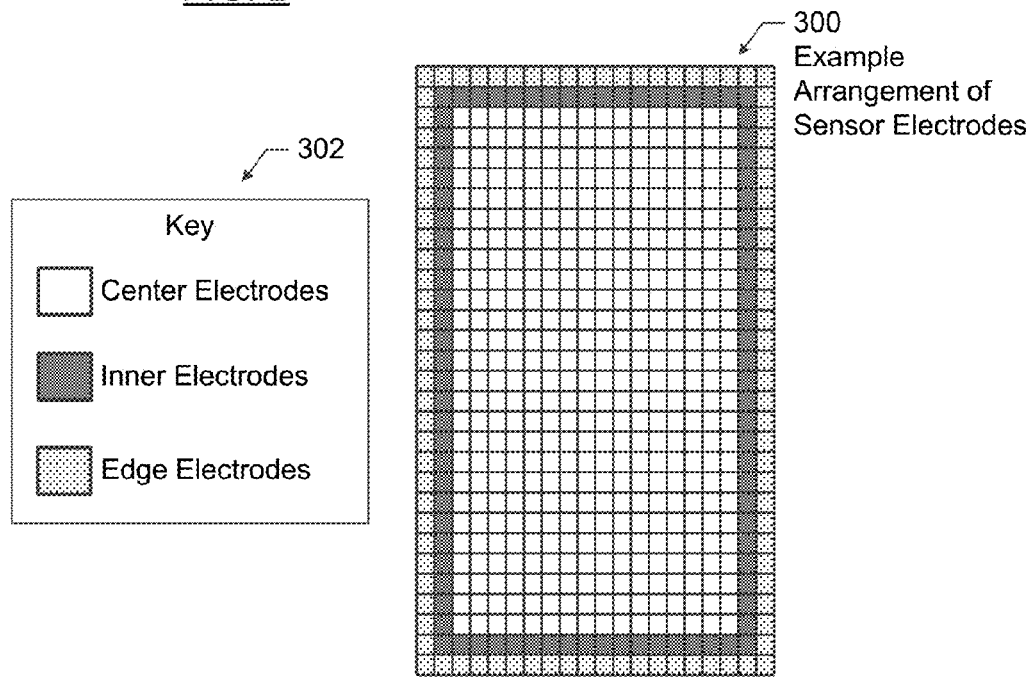

FIG. 3 shows an example arrangement of sensor electrodes (300) in accordance with one or more embodiments of the invention. In the example arrangement, sensor electrodes are arranged in a grid pattern, whereby each square of the grid in FIG. 3 is a position of an individual sensor electrode. In one or more embodiments, the sensor electrodes in FIG. 3 may each be used to obtain absolute capacitive measurements. In one or more embodiments, the sensor electrodes in FIG. 3 may each be used to obtain mutual capacitive measurements (e.g., by driving transmitter signals and receiving resulting signals on adjacent sensor electrodes or by using sensor electrodes (not shown) for driving the transmitter signals). Although FIG. 3 appears to show the sensor electrodes as being in a single layer, the sensor electrodes may be in multiple layers. Further the particular arrangement of sensor electrodes may vary without departing from the scope of the invention.

As shown in key (302), the sensor electrodes may be partitioned into at least three groups (center electrodes, inner electrodes, and edge electrodes) based on the distance of the respective electrodes to the side surface of the input device. In particular, edge electrodes are sensor electrodes that are closest to the side surface of the input device. In the embodiments shown in FIG. 3, the edge electrodes are adjacent to the side surface or the bezel and encompass two rows (top and bottom) and two columns (left and right). However, in other embodiments, the edge electrodes may encompass more than two rows and/or columns. For example, the edge electrodes may be the outer n-most sets of electrodes (e.g., the outer three rows and columns). The center electrodes are farthest from the side surface. The inner electrodes are in between the edge electrodes and the center electrodes. In the embodiment shown in FIG. 3, the inner electrodes are adjacent to the edge electrodes and adjacent to the center electrodes. In other words, the inner electrodes encompass two rows (top and bottom) and two columns (left and right). However, in other embodiments, the inner electrodes may encompass more than two rows and/or columns. For example, the inner electrodes may be the next-outer m-most sets of electrodes (e.g., the four rows and columns that are together adjacent to the edge electrodes).

Various configurations of input devices exist or may be used. One or more embodiments are not limited to the above described configuration. For example, in some embodiments, the bezel may be omitted. In some embodiments, the front surface and/or the back region is curved. Additionally, the arrangement, number, dimensions, other aspects, or any combination thereof of the sensor electrodes may vary from the embodiments shown in FIG. 3 without departing from the scope of the invention. Further, although FIGS. 2 and 3 shows an input device that appears as a smart phone, other types of input devices may be used without departing from the scope of the invention.

Figure 4:
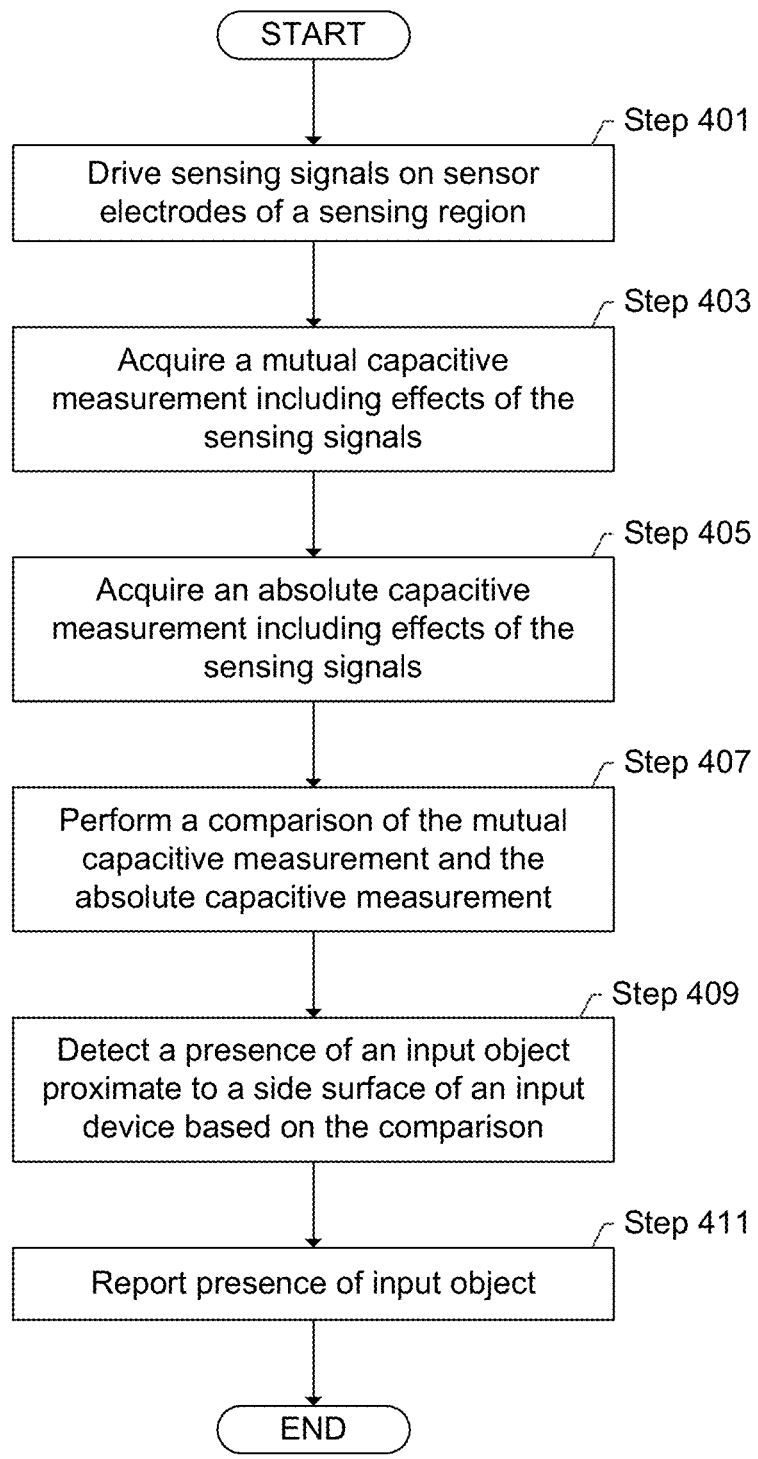
FIGS. 4, 5, and 6 shows flowcharts in accordance with one or more embodiments of the invention.
Figure 5:
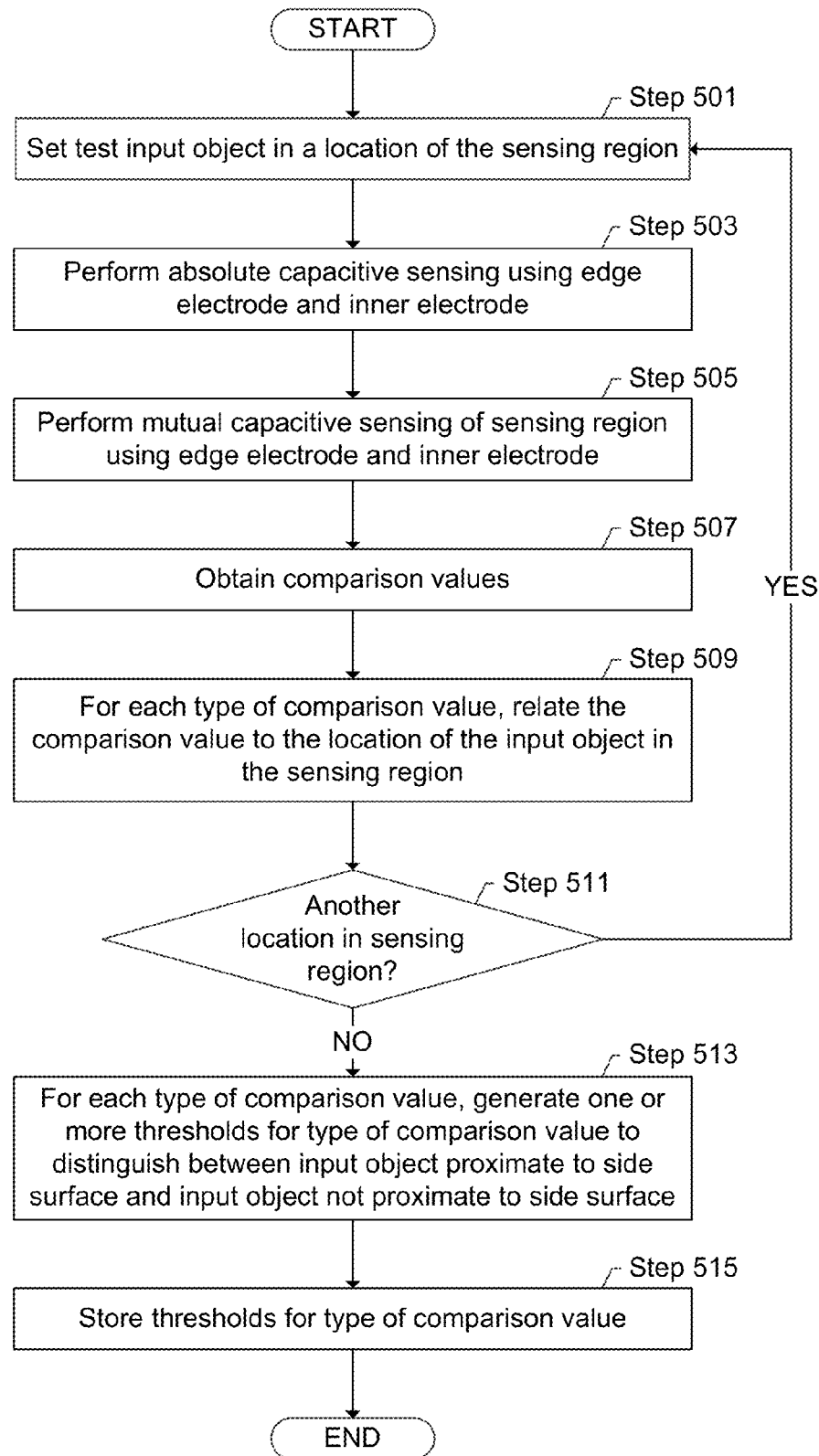
Figure 6:
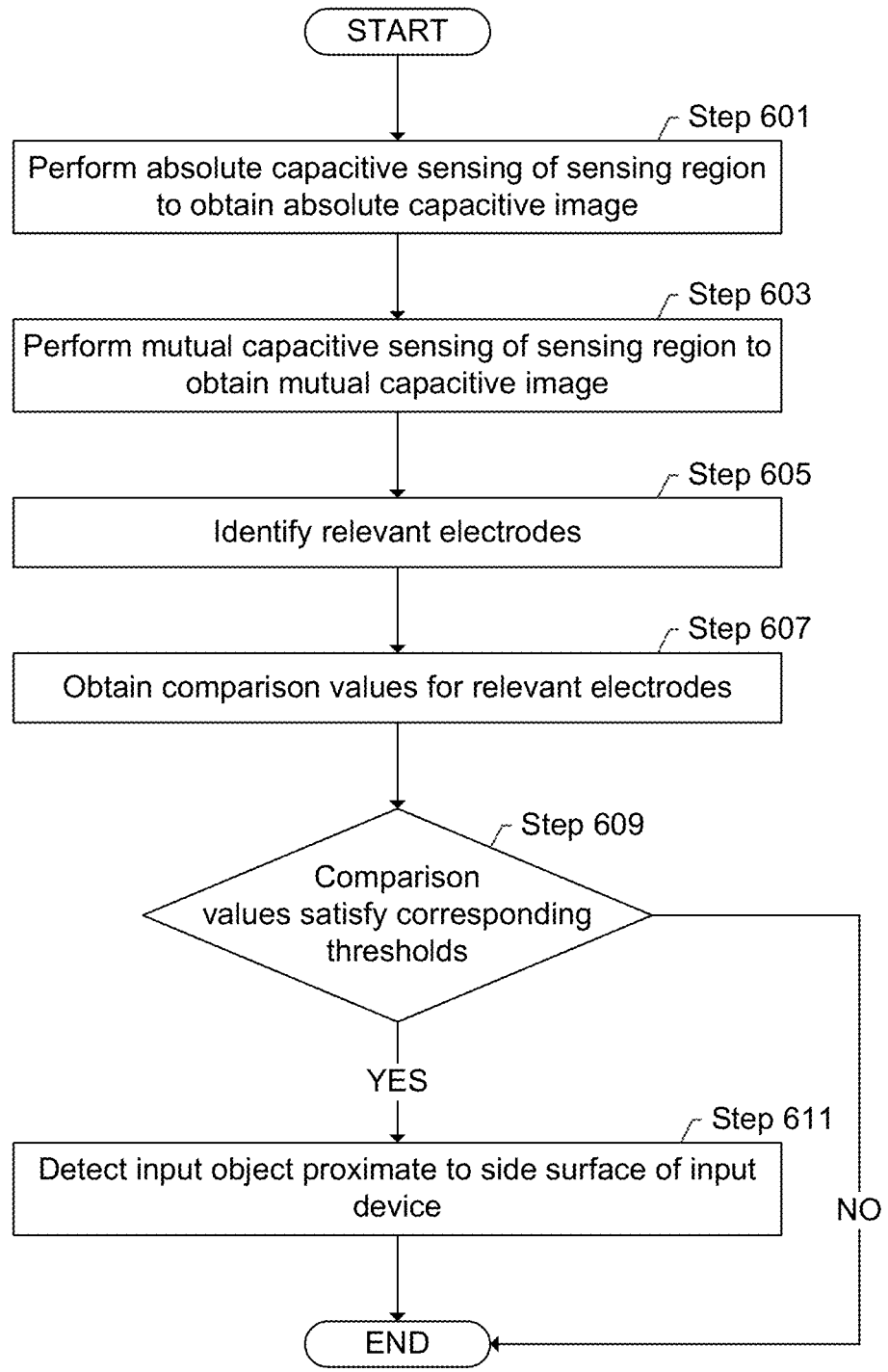

FIGS. 4-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 shows a flowchart for capacitive sensing in accordance with one or more embodiments of the invention. In Step 401, sensing signals are driven on sensor electrodes of a sensing region in accordance with one or more embodiments of the invention. In some embodiments sensing signals for obtaining absolute capacitive measurements are different than the sensing signals used for obtaining mutual capacitive measurements. For example, for the absolute capacitive measurements, the sensor electrodes may be driven with modulated signals that are modulated with respect to a reference voltage. Based on the modulating, the sensor circuitry may detect the absolute capacitance of the sensor electrodes, which may be affected by any input object and/or background capacitance. By way of another example, mutual capacitance sensor data may be obtained by the sensor circuitry driving transmitter electrodes with transmitter signals and receiving resulting signals using receiver electrodes. Like absolute capacitance, the resulting signals are affected by input objects and/or background capacitance. The change in capacitance reflects the amount of the resulting signal that is attributable to an input object rather than the original modulating of the sensor electrode or the background capacitance. Preprocessing may be performed on the capacitive sensor data. For example, the preprocessing may be to apply temporal and/or spatial filters, subtract a baseline, or perform any other operations.

In some embodiments, based on the sensing signals a location of the input object may be determined. If an input object is proximate to a side surface or a distance from the sensing region, the location may be a general location. For example, the general location may be the edge and inner electrodes that exhibit a change in capacitance satisfying the threshold. In such embodiments, the method may proceed with measurements acquired using the identified electrodes. In some embodiments, the method proceeds with the same measurements from when the general location was determined. In other embodiments, new measurements are acquired.

In Step 403, a mutual capacitive measurement is acquired that include the effects of the sensing signals in accordance with one or more embodiments of the invention. For example, from the resulting signals, a mutual capacitive measurement may be obtained as discussed above. The obtained mutual capacitive measurement may be for an edge electrode or an inner electrode. Further, multiple mutual capacitive measurements may be obtained for multiple identified electrodes. In Step 405, an absolute capacitive measurement is acquired that include the effects of the sensing signals in accordance with one or more embodiments of the invention. The obtained absolute capacitive measurement may be for an edge electrode or an inner electrode. In some embodiments, the obtained mutual capacitive measurement may involve multiple groups of electrodes. For example, the transmitter electrode in a mutual capacitive measurement may be an inner electrode while the receiver electrode is an edge electrode. Further, multiple absolute capacitive measurements may be obtained for multiple identified electrodes.

In Step 407, a comparison is performed of the absolute capacitive measurement and the mutual capacitive measurement in accordance with one or more embodiments of the invention. In one or more embodiments, the comparison may be obtaining a ratio or performing another mathematical function between the absolute capacitive measurement and the mutual capacitive measurement.

In one or more embodiments, the absolute capacitive measurement may detect input objects that are at a greater distance to the surface sensing region than the mutual capacitive measurement. In other words, the mutual capacitive sensing may identify objects that are close to the input device. Thus, comparing the absolute capacitive measurement and the mutual capacitive measurement may be used to distinguish between an input object on a side from an input object that is hovering over the sensing region.

Further, the comparison may be performed using the same or different electrodes. For example, when an input object is proximate to the side surface of the sensing region, a greater magnitude of a measurement is received from an edge electrode and less of a response is received from an inner electrode. However, as an input object moves to hovering over the input device, the stronger magnitude of a measurement is received from the inner electrode.

In some embodiments, a comparison is between an edge electrode's absolute capacitive measurement as compared to an edge electrode's mutual capacitive measurement. In some embodiments, a comparison is between an edge electrode mutual capacitive measurement versus an inner electrode's absolute capacitive measurement. Other comparisons may be performed without departing from the scope of the invention.

In one or more embodiments of the invention, the comparison is performed for each possible position of the input object proximate to the side surface. For example, the comparison may be performed for multiple sensor electrodes that are identified as the general location of the input object. In another example, the comparison may be performed for each set of one or more sensor electrodes that are on the side of the surface sensing region that neighbors to the side surface of the input device.

In Step 409, a presence of an input object proximate to a side surface of the input device is detected based on the comparison. In one or more embodiments, performing the comparison may result in a comparison value. The comparison value may be analyzed to determine whether the presence of the input object is detected. For example, the comparison value may be compared to one or more criterion to determine whether the comparison value satisfies the criterion. By way of an example, the criterion may be one or more thresholds to be satisfied (e.g., by being greater than a threshold, less than a threshold, equal to a threshold). In some embodiments, different criterion or thresholds may be used depending on which sensor electrodes were used for the capacitive measurements. Other criterion may exist and be used without departing from the scope of the invention.

In one or more embodiments of the invention, multiple comparisons may be performed. In some embodiments, detecting the presence of an input object proximate to the side surface may require that each comparison is satisfied. In some embodiments, detecting the presence of an input object proximate to the side surface may require that at least a subset of comparisons is satisfied.

In one or more embodiments, multiple comparisons may be analyzed in together to identify positional information. For example, comparison values for different electrodes along the side surface of the sensing region may be compared to each other to identify a location of the input object along the side surface.

In Step 411, the presence of the input object is reported in accordance with one or more embodiments of the invention. In particular, based on the comparison, the positional information may be determined. The positional information may include the location of the input object along the side surface, an estimated distance from the side surface, an estimated size of the input object, whether movement of the input object is detected (e.g., by comparing several frames of sensing), other information, or any combination thereof. The positional information may be reported to the host device (e.g., a host operating system, an application executing on the host device, a central processing unit, etc.). Based on the positional information, a user interface action may be performed. For example the user interface action may be changing the host device from a low power mode, changing a volume, opening an application, updating the display, performing another action, or any combination thereof.

FIGS. 5 and 6 show flowcharts for performing threshold based comparisons in accordance with one or more embodiments of the invention. In particular, FIG. 5 shows a flowchart for training to obtain thresholds for each comparison type in accordance with one or more embodiments of the invention. FIG. 6 shows a flowchart for using thresholds in accordance with one or more embodiments of the invention.

Turning to FIG. 5, in accordance with one or more embodiments of the invention, the training is performed for a set having one or more edge electrodes and one or more inner electrodes that are used for one or more comparisons. The set of electrodes together are perpendicular and adjacent to a particular location on the side surface. The training may be performed individually for each set of electrodes. In such an example, each set of electrodes may be assumed to have different thresholds that apply to the electrodes. By way of another example, the training may be performed once for several sets and the same thresholds may be used individually for each set. In such an example, several sets of electrodes may be assumed to have the same thresholds apply. The training for multiple sets of electrodes may be performed in parallel.

In Step 501, a test input object is set in a location of the sensing region in accordance with one or more embodiments of the invention. In other words, the input object is physically placed in a known location of the sensing region.

In Step 503, absolute capacitive sensing using an edge electrode and an inner electrode is performed in accordance with one or more embodiments of the invention. In Step 505, mutual capacitive sensing using an edge electrode and an inner electrode is performed in accordance with one or more embodiments of the invention. The absolute capacitive sensing and the mutual capacitive sensing may be performed in a same or similar manner as discussed above with reference to FIG. 4. In one or more embodiments, for each sensor electrode in the set of electrodes an absolute capacitive measurement and a mutual capacitive measurement are acquired.

In Step 507, comparison values are obtained in accordance with one or more embodiments of the invention. In particular, one or more comparisons are performed using the absolute capacitive measurements and the mutual capacitive measurements. The comparisons may be performed in a same or similar manner discussed above with reference to FIG. 4.

In Step 509, for each type of comparison value, the comparison value is related to the location of the input object in the sensing region in accordance with one or more embodiments of the invention. In other words, for each comparison, the corresponding comparison value obtained during the test is stored with an identifier of the location of the input object and an identifier of the comparison. The storage with the identifier of the location and the comparison may be explicit or implicit. For example, the identifier of the location may be implicitly stored by the position of the comparison value in storage. Similarly, the identifier of the comparison performed may be implicit by grouping the comparison values for the same comparison together. Various techniques for storage may be used without departing from the scope of the invention.

In Step 511, a determination is made whether another location in the sensing region exists in accordance with one or more embodiments of the invention. If another unprocessed location exists, then the test input object is physically moved to the next location in the sensing region in Step 501. In other words, the training may iterate through locations by physically moving the input object, obtaining measurements and performing comparisons. Although FIG. 5 shows that the comparisons are performed while iterating through locations, the comparisons may be performed at any time after the measurements used for the comparisons are acquired, including after sensing for all locations is complete.

In Step 513, for each type of comparison value, one or more thresholds are generated for the type of comparison value to distinguish between an input object that is proximate to the side surface and an input object that is not proximate to the side surface in accordance with one or more embodiments of the invention. In one or more embodiments, locations of the sensing region that are proximate to the side surface are identified. One or more thresholds are set such that the measurements for the locations proximate to the side surface satisfy the threshold and as many measurements outside of the locations proximate to the side surface as possible do not satisfy the threshold. For example, an upper bound threshold may be set such that all comparison values for locations proximate to the side surface are less than the upper bound threshold and as many comparison values, which are for locations not proximate to the side surface, as possible, are greater than the upper bound threshold. Conversely, a lower bound threshold may be set such that all comparison values for locations proximate to the side surface are greater than the upper bound threshold and as many comparison values, that are for locations not proximate to the side surface, as possible, are less than the upper bound threshold.

In one or more embodiments, the comparisons that are used are defined so as together the comparisons distinguish locations proximate to the side surface from locations which are not proximate to the side surface. The combination of comparisons may be an "and" operator between comparisons (e.g., criteria of all comparisons must be satisfied), an "or" operator (e.g., criteria of at least one comparison must be satisfied), or any other combination. Thus, while a single comparison may not be able to distinguish between an input object proximate to the side surface, multiple comparisons may be used in accordance with one or more embodiments of the invention.

In Step 515, thresholds for the type of comparison values are stored in accordance with one or more embodiments of the invention. In particular, the thresholds may be stored in memory used by the processing system. In one or more embodiments, FIG. 5 is performed as part of determining configuration parameters for a type of input device or arrangement of sensor electrodes. Once determined, the thresholds may be stored in each input device to which the thresholds are applicable.

Although FIG. 5 shows performing the training for a single input object, the training may be performed for multiple input objects. In other words, because different types and sizes of input object may change the capacitance, measurements may be acquired for various types and/or sizes. The thresholds may be set in Step 513 to accommodate the different types and sizes.

FIG. 6 shows a flowchart for using the thresholds in accordance with one or more embodiments of the invention. In Step 601, absolute capacitive sensing of a sensing region is performed to obtain an absolute capacitive image or profile in accordance with one or more embodiments of the invention. In Step 603, mutual capacitive sensing of a sensing region is performed to obtain a mutual capacitive image in accordance with one or more embodiments of the invention. Steps 601 and 603 may be performed in a same or similar manner as discussed above with reference to FIG. 4. Further, as discussed above, preprocessing may be performed on the respective images.

In Step 605, relevant electrodes are identified in accordance with one or more embodiments of the invention. The relevant electrodes are electrodes within the general location of the input object. For example, the relevant electrodes may be electrodes that have one or more measurements satisfying a detection threshold. By way of another example, the relevant electrodes may be electrodes that are in a set of electrodes used together for comparison, whereby the set includes an electrode with a measurement satisfying a detection threshold. Other techniques for identifying relevant electrodes may be used without departing from the scope of the invention.

In Step 607, comparison values are obtained for the relevant electrodes in accordance with one or more embodiments of the invention. The comparison values may be obtained in a same or similar manner to Step 507 of FIG. 5.

In Step 609, a determination is made whether the comparison values satisfy the corresponding thresholds in accordance with one or more embodiments of the invention. In particular, for each comparison (i.e., type of comparison value), the determination is made whether the comparison value for the comparison satisfies the one or more thresholds defined for the comparison. The result for the comparison is a satisfied or not satisfied in accordance with one or more embodiments of the invention. For multiple comparisons, the results may be combined in a same manner discussed above with reference to FIG. 5 (e.g., by performing the "and" operation, the "or" operation or any combination thereof as defined by the training in FIG. 5).

If the result(s) indicate that the input object is proximate, then in Step 611, the input object is detected as being proximate to the side surface of the input device in accordance with one or more embodiments of the invention. In some embodiments, the exact location of the input object proximate to the side surface may be estimated by comparing the comparison values in FIG. 6 with the comparison values determined in FIG. 5. The detection of the input object and/or positional information may be reported (not shown).

The flow may proceed to end if an input object is not detected on the side surface. Regardless of whether an input object is detected on a side surface, other processing may be performed.

Figure 7:
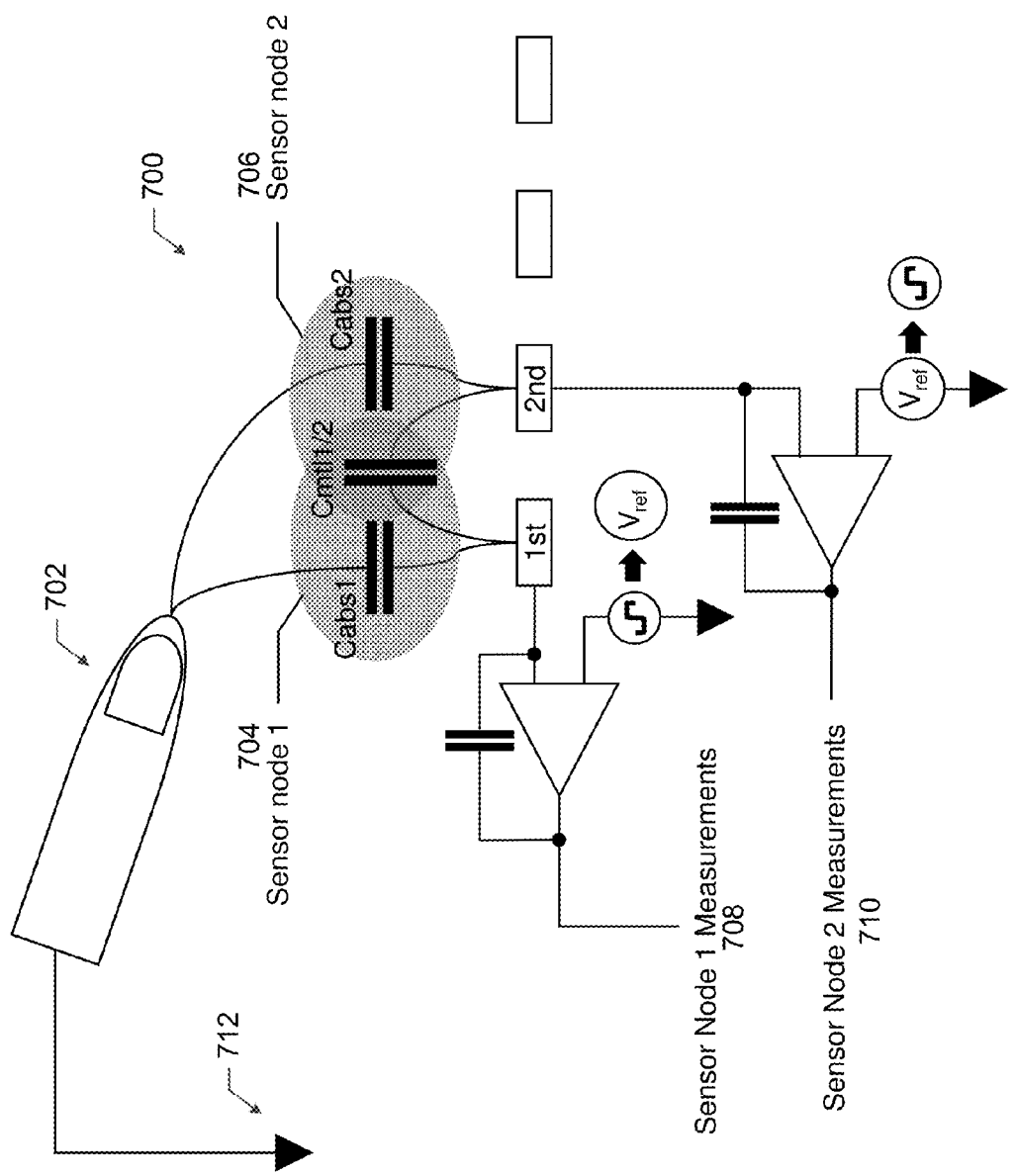

The following example is for explanatory purposes only and not intended to limit the scope of the invention. FIG. 7 shows an example of a capacitive input device (700) in accordance with one or more embodiments of the invention. As shown in FIG. 1, the capacitive input device includes a first and second sensor electrode (labeled $1^{st}$ and $2^{nd}$ in FIG. 7).

When an input object, such as finger (702) is in the sensing region and measurements of the sensing region are acquired, the following sensing may be performed. Absolute capacitive sensing may be performed using first sensor electrode (Cabs1) and second sensor electrode (Cabs2) by themselves. Mutual capacitive sensing Cmtl1/2 may be performed using first sensor electrode (Cabs1) as a transmitter electrode and second sensor electrode (Cabs2) as a receiver electrode. In other words, the mutual capacitive measurement may be attributed to the second sensor electrode in accordance with one or more embodiments of the invention. Mutual capacitive sensing Cmtl1/2 may be performed using second sensor electrode (Cabs2) as a transmitter electrode and first sensor electrode (Cabs1) as a receiver electrode. The mutual capacitive measurement may be attributed to the first sensor electrode in accordance with one or more embodiments of the invention. Thus, sensor node 1 (704) includes the absolute capacitive sensing using the first sensor electrode (Cabs1) and the mutual capacitive sensing whereby the first sensor electrode (Cabs1) received the resulting signal. Sensor node 2 (706) includes the absolute capacitive sensing using the second sensor electrode (Cabs2) and the mutual capacitive sensing whereby the second sensor electrode (Cabs2) received the resulting signal.

When a finger (702) is near sensor node 1 (704) and sensor node 2 (706), the finger (702) may cause a change in capacitance based on being connected to ground (712). Thus, the resulting measurements acquired using the respective sensing techniques are affected by the presence of the finger (702) thereby indicating the finger's presence. The measurements may be combined into sensor node 1 measurements (708) and sensor node 2 measurements (710). In the example, the first sensor electrode may be an edge electrode and the second sensor electrode may be an inner electrode.

As discussed above, FIG. 7 is only an example. By way of another possible configuration, a separate transmitter electrode may exist on the same or different layer as the first sensor electrode and the second sensor electrode. In such an example, the first sensor electrode and the second sensor electrode may be receiver electrodes for the mutual capacitive sensing.

FIGS. 8.1-8.6 show an example set of graphs for training a processing system to detect an input object proximate to the side surface. In particular, FIG. 8.1 shows an example graph (800) of an absolute capacitive finger response for an edge electrode. In particular, FIG. 8.1 shows a cross section of a sensing region in accordance with one or more embodiments of the invention. The hover height (802) for the vertical axis is the distance above or below the surface sensing region. The recess distance (804) along the horizontal axis is the distance across the sensing region (e.g., left to right). The point (0, 0) is at the corner of the input device. Thus, in the graph (800), negative recess distance and negative hover height corresponds to a position below the surface sensing region along the device side but not exactly touching the side. Negative recess distance and positive hover height corresponds to a position above the level of the surface sensing region but not over the surface sensing region. Positive recess distance and positive hover height corresponds to a position above and over the surface sensing region. Positive recess distance and negative hover height corresponds to invalid locations (806) as the invalid locations are in the interior of the input device.

The greyscale value at the various positions shown in the graph (800) corresponds to the measurement obtained using absolute capacitive sensing with a particular edge electrode when a known input object is located at the position. The scale for the greyscale is denoted by key (808). As shown in graph (800), the absolute capacitive measurements may not be able to distinguish between whether an input object is proximate to a side surface.

FIGS. 8.2 and 8.3 show example graphs (820, 830) of a first comparison in accordance with one or more embodiments of the invention. In particular, FIG. 8.2 is a same cross sectional view of the sensing region as FIG. 8.1. In other words, the axes are the same in FIG. 8.2 as in FIG. 8.1.

In FIG. 8.2, the greyscale at the various positions shown in the graph (800) correspond to a comparison of an absolute capacitive measurement of the edge electrode in FIG. 8.1 and the mutual capacitive measurement obtained for the edge electrode when the input object is located at the respective position. The comparison in FIG. 8.2 is a ratio of the two measurements. The graph (830) in FIG. 8.3 is a three dimensional version of the graph (820) of FIG. 8.2. An upper and lower threshold is for input objects proximate to a side surface of the sensing region (e.g., extending from position (−2,−6) to (0, 0)). However, as shown in graphs (820, 830) of FIGS. 8.2 and 8.3, false positives exist along the two dimensional surface of the sensing region.

FIGS. 8.4 and 8.5 show example graphs (840, 850) of a second comparison in accordance with one or more embodiments of the invention. In particular, FIG. 8.4 is a same cross sectional view of the sensing region as FIG. 8.1. In other words, the axes are the same in FIG. 8.3 as in FIG. 8.1.

In FIG. 8.4, the greyscale at the various positions shown in the graph (800) correspond to a comparison of a mutual capacitive measurement of the same edge electrode as in FIG. 8.1 and the absolute capacitive measurement obtained for the inner electrode that is adjacent to the edge electrode. The comparison value at the various positions is defined for when the input object is located at the respective position. The comparison in FIG. 8.4 is a ratio of the two measurements. The graph (850) in FIG. 8.5 is a three dimensional version of the graph (840) of FIG. 8.3. An upper and lower threshold is for input objects proximate to a side surface of the sensing region (e.g., extending from position (−2,−6) to (0, 0)). However, as shown in graphs (840, 850) of FIGS. 8.4 and 8.5, false positives exist along the side surface that is distant from the side surface.

By combining comparisons and thresholds, input objects being in locations proximate to the side surface may be identified. Graph (860) of FIG. 8.6 shows the edge electrode absolute capacitive image in FIG. 8.1 that is masked based on the thresholds determined from the comparisons in FIGS. 8.2, 8.3, 8.4, and 8.5. Notably in FIG. 8.1, the scale of the values from FIG. 8.1 is changed as shown in key (862). To obtain FIG. 8.6, the mask of FIG. 8.2 removes any positions from FIG. 8.6 that do not satisfy the thresholds set using FIG. 8.2; and the mask of FIG. 8.4 removes any positions from FIG. 8.6 that do not satisfy the thresholds set using FIG. 8.4. Thus, the false positives discussed above individually with reference to FIGS. 8.2 and 8.4 are removed by the other comparison. As shown in FIG. 8.6, after removing any position that does not satisfy the thresholds set for both comparisons in FIG. 8.2 and comparison in FIG. 8.4, the resulting positions correspond to an input object being proximate to the side surface.

Thus, once training is complete the thresholds may be used as follows in the example. When an input object is in the sensing region, the position of the input object may be unknown. To determine whether the input object is proximate to the side surface, a determination is made whether the ratio of an absolute capacitive measurement of the edge electrode and the mutual capacitive measurement obtained for the edge electrode satisfies the thresholds for FIGS. 8.2 and 8.3. If satisfied, a determination is made whether the ratio of a mutual capacitive measurement of the same edge electrode and the absolute capacitive measurement obtained for the inner electrode that is adjacent to the edge electrode satisfies the thresholds for FIGS. 8.4 and 8.6. If both sets of thresholds are satisfied, then the input object is determined to be proximate to the side surface of the sensing region. If both thresholds are not satisfied, then the input object may be determined not to be proximate to the side surface. As discussed above, the above is only an example. Other comparisons may be performed and measurements acquired without departing from the scope of the invention.

The above techniques may be used to allow for user interface actions based on capacitance when an input device does not have electrodes on a side surface or a surface sensing region on the side surface. For example, when a user's fingers scrolls along the side of the input device and performing the above operation over several frames, the processing system may detect the scroll. The processing system may determine that the user wants to increase a volume purely using capacitive sensing rather than physical buttons. Thus, in the example, the physical volume buttons may be omitted from the input device in some embodiments. Other example uses are also contemplated herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system, comprising:
   sensor circuitry configured to:
      drive sensing signals on a plurality of sensor electrodes of a sensing region, the sensing region comprising a surface sensing region,
      acquire a mutual capacitive measurement comprising effects of the sensing signals, and
      acquire a first absolute capacitive measurement comprising effects of the sensing signals; and
   processing circuitry configured to:
      perform a first comparison of the mutual capacitive measurement and the first absolute capacitive measurement to obtain a comparison value,
      determine whether the comparison value exceeds a first threshold, and
      detect, in response to determining that the comparison value exceeds the first threshold, a presence of an input object proximate to a side surface of an input device.

2. The processing system of claim 1, wherein the mutual capacitive measurement is obtained using a first electrode, and the first absolute capacitive measurement is obtained using a second electrode.

3. The processing system of claim 2, wherein the first electrode is closer to the side surface than the second electrode.

4. The processing system of claim 1, wherein the mutual capacitive measurement is obtained using the same electrode as the first absolute capacitive measurement.

5. The processing system of claim 1, wherein the comparison value is a ratio value corresponding to a ratio between the mutual capacitive measurement and the first absolute capacitive measurement.

6. The processing system of claim 1, wherein detecting the presence comprises determining whether the comparison value is within a range set by the first threshold and a second threshold.

7. The processing system of claim 6, wherein the first threshold and the second threshold are set by:
generating training data for the first comparison, wherein the training data comprises a plurality of comparison results each being for a predefined input object placed in a plurality of locations of the sensing region;
identifying the first threshold and the second threshold that distinguishes between locations of the plurality of locations proximate to the side surface as compared to location of the plurality of locations not proximate to the side surface.

8. The processing system of claim 1, wherein the sensor circuitry is further configured to:
acquire a second absolute capacitive measurement comprising effects of the sensing signals;
wherein the processing circuitry is further configured to:
perform a second comparison of the mutual capacitive measurement and the second absolute capacitive measurement,
wherein the presence is detected based on the first comparison and the second comparison both satisfying a criteria.

9. A method for capacitive sensing comprising:
acquiring a mutual capacitive measurement comprising effects of sensing signals of a sensing region comprising a surface sensing region;
acquiring a first absolute capacitive measurement comprising effects of the sensing signals;
performing a first comparison of the mutual capacitive measurement and the first absolute capacitive measurement to obtain a comparison value;
determining whether the comparison value exceeds a first threshold; and
detecting, in response to determining that the comparison value exceeds the first threshold, a presence of an input object proximate to a side surface of an input device.

10. The method of claim 9, wherein the mutual capacitive measurement is obtained using a first electrode, and the first absolute capacitive measurement is obtained using a second electrode.

11. The method of claim 10, wherein the first electrode is closer to the side surface than the second electrode.

12. The method of claim 9, wherein the mutual capacitive measurement is obtained using the same electrode as the first absolute capacitive measurement.

13. The method of claim 9, wherein the comparison value is a ratio value corresponding to a ratio of the mutual capacitive measurement to the first absolute capacitive measurement.

14. The method of claim 9, wherein detecting a presence comprises determining whether the comparison value is within a range set by the first threshold and a second threshold.

15. The method of claim 14, wherein the first threshold and the second threshold are set by:
generating training data for the first comparison, wherein the training data comprises a plurality of comparison results each being for a predefined input object placed in a plurality of locations of a sensing region, the sensing region comprising a surface sensing region;
identifying the first threshold and the second threshold that distinguishes between locations of the plurality of locations proximate to the side surface as compared to location of the plurality of locations not proximate to the side surface.

16. The method of claim 9, further comprising:
acquiring a second absolute capacitive measurement comprising effects of the sensing signals;
performing a second comparison of the mutual capacitive measurement and the second absolute capacitive measurement,
wherein the presence is detected based on the first comparison and the second comparison both satisfying a criteria.

17. An input device for capacitive sensing comprising:
a plurality of sensor electrodes for receiving resulting signals from sensing signals; and
a processing system configured to:
acquire a mutual capacitive measurement using the resulting signals;
acquire an absolute capacitive measurement using the resulting signals;
perform a comparison of the mutual capacitive measurement and the absolute capacitive measurement to obtain a comparison value; and
determine whether the comparison value based on the mutual capacitive measurement and the absolute capacitive measurement exceeds a threshold;
detect, in response to determining that the comparison value exceeds the threshold, a presence of an input object proximate to a side surface of an input device.

18. The input device of claim 17, wherein the mutual capacitive measurement is obtained using a first electrode, and the absolute capacitive measurement is obtained using a second electrode.

19. The input device of claim 18, wherein the first electrode is closer to the side surface than the second electrode.

20. The input device of claim 17, wherein the mutual capacitive measurement is obtained using the same electrode as the absolute capacitive measurement.

* * * * *